United States Patent
Dong et al.

(10) Patent No.: US 10,824,491 B2
(45) Date of Patent: Nov. 3, 2020

(54) SYSTEM INFORMATION TRANSMITTING METHOD AND APPARATUS, AND COMPUTER-READABLE STORAGE MEDIUM

(71) Applicant: BEIJING XIAOMI MOBILE SOFTWARE CO., LTD., Beijing (CN)

(72) Inventors: Junjie Dong, Beijing (CN); Shun Chen, Beijing (CN); Hongguang Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/818,067

(22) Filed: Mar. 13, 2020

(65) Prior Publication Data

US 2020/0293390 A1 Sep. 17, 2020

(30) Foreign Application Priority Data

Mar. 14, 2019 (CN) .......................... 2019 1 0191800

(51) Int. Cl.
*G06F 9/54* (2006.01)
*G06F 3/0488* (2013.01)
*G06F 9/451* (2018.01)
*H04L 29/06* (2006.01)

(52) U.S. Cl.
CPC ............ *G06F 9/547* (2013.01); *G06F 3/0488* (2013.01); *G06F 9/451* (2018.02); *G06F 9/543* (2013.01); *H04L 69/22* (2013.01)

(58) Field of Classification Search
CPC ............................ G06F 9/547; G06F 9/45512
USPC .................................................. 719/311, 320
See application file for complete search history.

(56) References Cited

U.S. PATENT DOCUMENTS

| | | | |
|---|---|---|---|
| 10,339,198 B2 * | 7/2019 | Comstock | H04W 4/14 |
| 2009/0225039 A1 | 9/2009 | Williamson et al. | |
| 2011/0122070 A1 | 5/2011 | Smith et al. | |
| 2015/0205393 A1 | 7/2015 | Smus | |

OTHER PUBLICATIONS

Extended European Search Report of counterpart EP Application No. 20162137.2 dated Aug. 10, 2020, (10p).

* cited by examiner

*Primary Examiner* — Andy Ho
(74) *Attorney, Agent, or Firm* — Arch & Lake LLP (57) ABSTRACT

A system information transmitting method and apparatus, and a computer-readable storage medium are provided. The method includes receiving, at a terminal, a system call instruction sent by a browser, acquiring, at the terminal, target system information according to the system call instruction, dividing, at the terminal, the target system information into at least one data set, obtaining, at the terminal, encoded pseudo-touch event information by encoding the at least one data segment in the target system information according to a positional relationship of respective touch points in a simulated pseudo-touch event in a touch plane, and transmitting, from the terminal, as an input parameter of the target script, the encoded pseudo-touch event information to the target script through the browser.

20 Claims, 5 Drawing Sheets

SYSTEM INFORMATION TRANSMITTING METHOD AND APPARATUS, AND COMPUTER-READABLE STORAGE MEDIUM

CROSS-REFERENCE TO RELATED APPLICATION

This application is based upon and claims priority to Chinese Patent Application 201910191800.9, filed on Mar. 14, 2019, the entire contents of which are incorporated herein by reference.

TECHNICAL FIELD

The present disclosure relates to the field of browser technology, and more particularly to a system information transmitting method and apparatus, and a computer-readable storage medium

BACKGROUND

With the development of the Internet, more and more functions can be implemented by executing scripts in web pages through browsers. When executing the scripts in the web pages to implement some functions, the browsers may need to call terminal systems, and transmit system information obtained by the calling, to the scripts of the web pages as input parameters of the scripts in the web pages. For example, when executing a script in a web page, a browser may need to call an application installed in a terminal, and transmit certain information of the application acquired by the calling, to the script as an input parameter of the script.

In related technologies, a browser that supports a W3C (World Wide Web Consortium) standard may transmit system information obtained by calling a terminal system, to a script in a web page through a standard interface.

However, in practical applications, many browsers do not support the W3C standard, and may not transmit the system information obtained by calling the terminal system, to the script in the web page, leading to limited execution of the script in the web page.

SUMMARY

Embodiments of the present disclosure provide a system information transmitting method and apparatus, and a computer-readable storage medium.

According to a first aspect of the disclosure, there is provided a system information transmitting method. In the method, a terminal receives a system call instruction sent by a browser, where the system call instruction may be generated when the browser executes a target script of a web page. The terminal acquires target system information according to the system call instruction. The terminal divides the target system information into at least one data set, where the at least one data set includes at least one data segment. The terminal obtains encoded pseudo-touch event information by encoding the at least one data segment in the target system information according to a positional relationship of respective touch points in a simulated pseudo-touch event in a touch plane. And the terminal transmits, as an input parameter of the target script, the encoded pseudo-touch event information to the target script through the browser.

According to a second aspect of the disclosure, there is provided a system information transmitting apparatus, which includes one or more processors, a non-tangible computer-readable storage medium for storing a plurality of instructions executable by the one or more processors, where the one or more processors may be configured to receive a system call instruction sent by a browser, where the system call instruction is generated when the browser executes a target script of a web page. The one or more processors may be configured to acquire target system information according to the system call instruction. The one or more processors may be configured to divide the target system information into at least one data set, where the at least one data set includes at least one data segment. The one or more processors may be configured to obtain encoded pseudo-touch event information by encoding the at least one data segment in the target system information according to a positional relationship of respective touch points in a simulated pseudo-touch event in a touch plane. And the one or more processors may be configured to transmit, as an input parameter of the target script, the encoded pseudo-touch event information to the target script through the browser.

According to a third aspect of the disclosure, there is provided a computer-readable storage medium, in which a computer program is stored, where the computer program is executed by a computing device having one or more processors to perform acts that may include receiving a system call instruction sent by a browser, where the system call instruction may be generated when the browser executes a target script of a web page. The one or more processors perform acts that may include acquiring target system information according to the system call instruction. The one or more processors perform acts that may include dividing the target system information into at least one data set, where the at least one data set includes at least one data segment. The one or more processors perform acts that may include obtaining encoded pseudo-touch event information by encoding the at least one data segment in the target system information according to a positional relationship of respective touch points in a simulated pseudo-touch event in a touch plane. And the one or more processors perform acts that may include transmitting, as an input parameter of the target script, the encoded pseudo-touch event information to the target script through the browser.

It is to be understood that both the foregoing general description and the following detailed description are examples and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the accompanying drawings, to present the objects, technical aspects, and advantages of the present disclosure more clearly.

The present disclosure will be described in detail herein, examples of which are illustrated in the accompanying drawings. The following description refers to the accompanying drawings in which the same numbers in different drawings represent the same or similar elements unless otherwise indicated. The implementations set forth in the following embodiments do not represent all implementations consistent with the present disclosure. Rather, they are merely examples of devices and methods consistent with certain aspects of the present disclosure as detailed in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

In the following, an implementation environment involved in the system information transmitting method provided by the embodiments of the present disclosure will be described.

Figure 1:
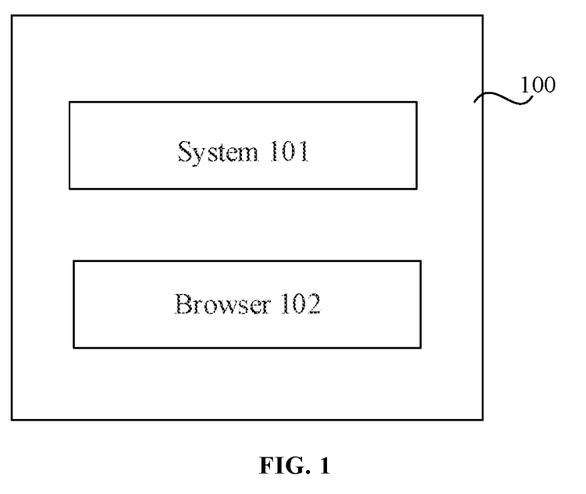
FIG. 1 is a schematic diagram showing an implementation, according to an example of the present disclosure.

FIG. 1 is a schematic diagram of an implementation environment involved in a system information transmitting method according to an embodiment of the present disclosure. As shown in FIG. 1, the implementation environment may include a terminal 100, wherein the terminal 100 may be a smart phone, a tablet computer, a wearable device, an MP3 (Moving Picture Experts Group Audio Layer III) player, an MP4 (Moving Picture Experts Group Audio Layer IV) player, an e-book reader, or a vehicle-mounted device, etc.

As shown in FIG. 1, the terminal 100 may include a system 101 and a browser 102. Among them, the system 101 may include at least one application, and the browser 102 may be a browser program or an application with a built-in browser kernel.

Figure 2:
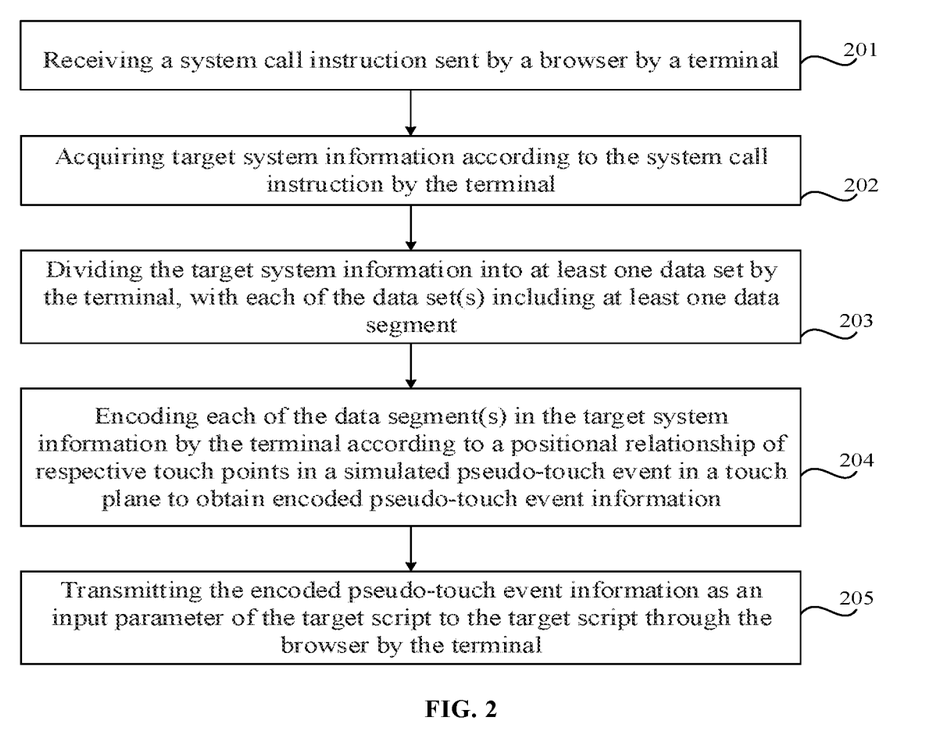
FIG. 2 is a flowchart showing a system information transmitting method, according to an example of the present disclosure.

FIG. 2 is a flowchart showing a system information transmitting method in accordance with the present disclosure. As shown in FIG. 2, the system information transmitting method is used in terminal 100 shown in FIG. 1 and includes the following steps.

In step 201, a terminal receives a system call instruction sent by a browser.

The system call instruction is generated when the browser executes a target script of a web page.

In step 202, the terminal acquires target system information according to the system call instruction.

In step 203, the terminal divides the target system information into at least one data set, with each of the data set(s) including at least one data segment. For example, at least one data set includes at least one data segment.

In step 204, the terminal encodes each of the data segment(s) in the target system information according to a positional relationship of respective touch points in a simulated pseudo-touch event in a touch plane to obtain encoded pseudo-touch event information. For example, the terminal can obtain an encoded pseudo-touch event information by encoding the at least one data segment in the target system information according to a positional relationship of respective touch points in a simulated pseudo-touch event in a touch plane In step 205, the terminal transmits the encoded pseudo-touch event information as an input parameter of the target script to the target script through the browser.

According to the system information transmitting method provided by the embodiments of the present disclosure, the terminal system is called at first to obtain the target system information; then the target system information is divided to obtain data segments; and finally, the respective data segments are encoded according to a positional relationship of respective touch points in a simulated pseudo-touch event in a touch plane to obtain encoded pseudo-touch event information. No matter whether supporting the W3C standard or not, the browsers have the function of transmitting the encoded touch event information to the script of the web page. Therefore, the browsers may transmit the encoded pseudo-touch event information to the target script of the web page as the input parameter, regardless of the supportability for the W3C standard, so that the browsers that do not support the W3C standard may also transmit the target system information obtained by calling the terminal system, to the target script in the web page, thereby ensuring the smooth execution of the target script in the web page.

Figure 3:
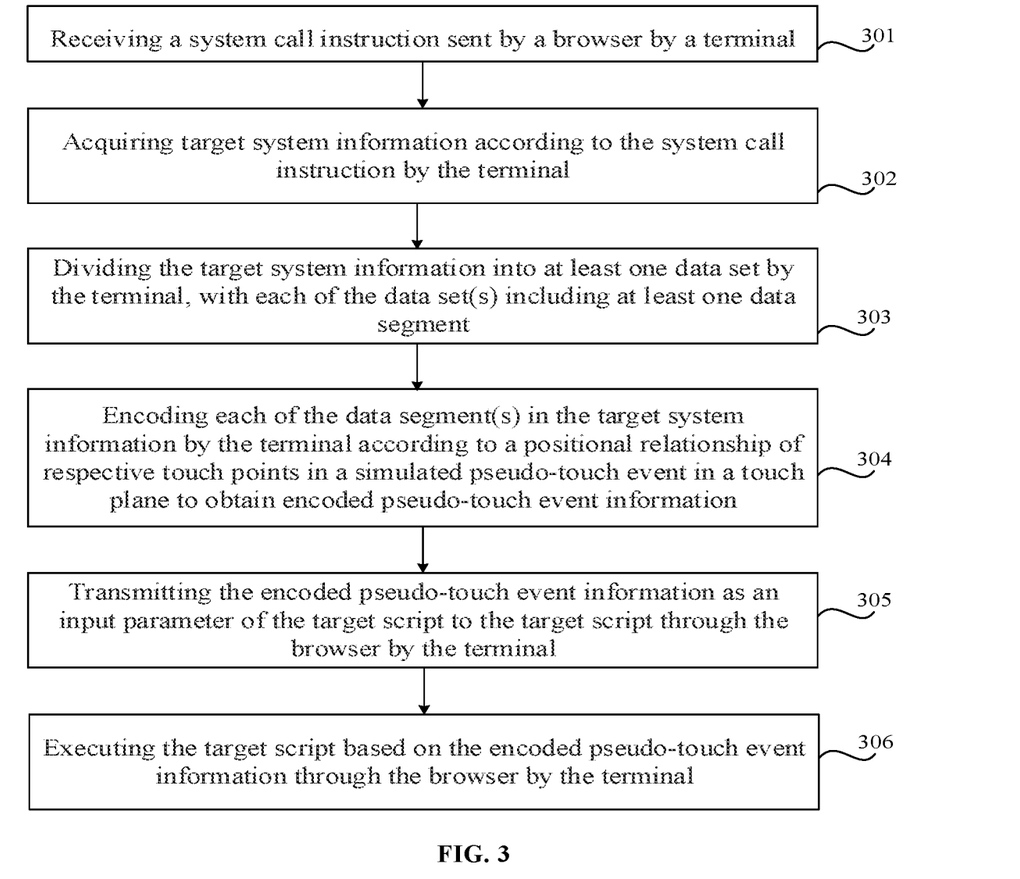
FIG. 3 is a flowchart showing a system information transmitting method, according to an example of the present disclosure.

FIG. 3 is a flowchart showing a system information transmitting method in accordance with the present disclosure. As shown in FIG. 3, the system information transmitting method is used in a terminal 100 shown in FIG. 1 and includes the following steps.

In step 301, a terminal receives a system call instruction sent by a browser.

Currently, many web pages have a built-in script for enriching the functions of the web pages, where the script is an executable file written according to a certain format.

When the browser executes the target script of the web page, a terminal system may need to be called. For example, when the browser executes a payment script on a web page for online payment, it may be necessary to call a payment application in the terminal system. For another example, when the browser executes an email sending script of the web page for mailing, it may be necessary to call a mail sending and receiving application in the terminal system. For another example, when the browser executes a login script of the web page to log in a website, it may be necessary to call a social application in the terminal system for logging in the website by means of a login credential of the social application.

When the browser needs to call the terminal system, the browser may generate a system call instruction, and send the system call instruction to the terminal system.

In step 302, the terminal acquires target system information according to the system call instruction.

After the terminal system is called according to the system call instruction, the terminal system may acquire corresponding target system information.

For example, after the payment application is called according to the system call instruction, the terminal system may obtain a payment success credential which is the target system information. For another example, after the mail sending and receiving application is called according to the system call instruction, the terminal system may acquire a mail sent credential which is the target system information. For another example, after the social application is called according to the system call instruction, the terminal system may acquire the login credential of the social application, which is the target system information.

To ensure the smooth execution of the target script, the terminal system typically needs to transmit the acquired target system information as an input parameter of the target script to the target script.

For example, the terminal system needs to transmit the payment success credential as the input parameter to the payment script, so that the payment script sends payment success information to a server; and after receiving the payment success information, the server may issue a corresponding product or service to a user. For another example, the terminal system needs to transmit the mail sent credential as the input parameter to the mail sending script, so that the mail sending script may issue a corresponding virtual item reward to the user. For another example, the terminal system needs to transmit the login credential of the social application, as the input parameter, to the login script, so that the login script may log in the website by means of the login credential of the social application.

For the browsers supporting the W3C (World Wide Web Consortium) standard, the terminal system may transmit the target system information to the target script through a standard interface, and for browsers that do not support the W3C standard, the terminal system may not transmit the target system information to the target script, which will affect the smooth execution of the target script in the browsers that do not support the W3C standard.

Regardless of the supportability for the W3C standard, all the browsers have the function of transmitting the encoded information of a touch event to the script of the web page. Therefore, in the embodiments of the present disclosure, in order to ensure the smooth execution of the target script in a browser that does not support the W3C standard, the terminal may simulate a pseudo-touch event, encode the target system information according to the positional relationship of respective touch points in the pseudo-touch event in the touch plane, and transmit the encoded pseudo-touch event information, obtained by the encoding, as the input parameter of the target script to the target script. It should be noted that, in this embodiment, the simulated touch event is named as a pseudo-touch event so as to distinguish it from a touch event normally triggered by a user.

In step 303, the terminal divides the target system information into at least one data set, with each of the data set(s) including at least one data segment.

In an embodiment of the present disclosure, each of the data segment(s) may have a length of 1 byte.

In step 304, the terminal encodes each of the data segment(s) in the target system information according to a positional relationship of respective touch points in a simulated pseudo-touch event in a touch plane to obtain encoded pseudo-touch event information.

The encoded pseudo-touch event information includes at least one encoded data set, where the at least one encoded data set is in one-to-one correspondence to the at least one data set obtained by dividing the target system information; each of the encoded data set(s) includes at least one encoded data segment; at least one encoded data segment included in an encoded data set is in one-to-one correspondence to the at least one data segment included in the data set corresponding to the encoded data set; and each of the encoded data segment(s) is obtained by encoding a corresponding data segment according to the format of touch information.

In an embodiment of the present disclosure, in order to characterize a rank of a data segment in the data set in which the data segment is located, the encoded data segment obtained by encoding the data segment according to the format of the touch information may include sequence information that may indicate a rank of a data segment in the data set in which the data segment is located.

In addition, in order to distinguish the encoded pseudo-touch event information from real touch information, and to prevent the encoded pseudo-touch event information from conflicting with a real touch event, the encoded pseudo-touch event information may include identification information that is configured to indicate that the encoded pseudo-touch event information is encoded target system information.

In practical applications, there are many modes for the terminal to encode the target system information according to the format of touch information. In this embodiment of the present disclosure, three example encoding manners are only used by way of example to briefly describe the technical process of encoding the target system information by the terminal.

In a first encoding mode, the terminal encodes each of the data segment(s) included in the target system information into coordinate values of two touch points (hereinafter referred to as the first touch point and the second touch point, respectively) in a first virtual ray, in the touch-plane coordinate system. That is, the touch points in the pseudo-touch event include the first touch point and the second touch point.

Among them, the coordinate values of the first and second touch points, obtained by encoding a certain data segment by the terminal, are the encoded data segments corresponding to the data segment. The first virtual ray is an imaginary ray in the touch plane with the preset touch point as an end point. Optionally, the preset touch point may be a center point of the touch plane, that is, the preset touch point may be a center point of a terminal screen.

An origin of the touch-plane coordinate system is a vertex at an upper left corner of the terminal screen; an x-axis of the touch-plane coordinate system is parallel to an upper boundary of the terminal screen, and has a positive direction in which the vertex at the upper left corner of the terminal screen points to a vertex at an upper right corner of the terminal screen; and a y-axis of the touch-plane coordinate system is parallel to a left boundary of the terminal screen, and has a positive direction in which the vertex at the upper left corner of the terminal screen points to a vertex at a lower left corner of the terminal screen.

Since in a real touch event, the probability that two different touch points are collinear with the preset touch point is low, the positional relationship may be set as the first touch point, the second touch point, and the preset touch point being located in the first virtual ray. In this way, by encoding the data segment into the coordinate values of the two touch points on the first virtual ray in the touch-plane coordinate system, the encoded pseudo-touch event information may be distinguished from the real touch information. Among them, the coordinate values, obtained by the encoding, of the two touch points in the touch-plane coordinate system may be regarded as the identification information in the encoded pseudo-touch information.

In this embodiment of the present disclosure, the terminal encoding a first data segment included in the target system information is used by way of example to describe the first encoding mode. Among them, the first data segment is any of the at least one data segment included in a first data set; and the first data set is any of the at least one data set obtained by dividing the target system information.

The technical process of encoding the first data segment included in the target system information by the terminal includes the following steps.

1. The terminal acquires a rank value of the first data segment among the at least one data segment included in the first data set.

2. The terminal acquires a first reference angle value according to the rank value of the first data segment among the at least one data segment included in the first data set.

The first reference angle value is an azimuth angle of the first virtual ray in the touch-plane coordinate system, where the azimuth angle refers to an angle between the positive direction of the x-axis and a certain direction. Then, the azimuth angle of the first virtual ray in the touch-plane coordinate system refers to an angle between the first virtual ray and the positive direction of the x-axis in the touch-plane coordinate system.

Optionally, the terminal may calculate the first reference angle value corresponding to the rank value according to a first formula, which is as follows:

$$\alpha = i \times \frac{360°}{n},$$

wherein α represents the first reference angle value, i represents the rank value, and n represents a number of data segments included in the first data set.

It may be known from the above description that the first reference angle value may characterize the rank value of the first data segment among the at least one data segment included in the first data set. In other words, in the first encoding mode, the first reference angle value is the sequence information in the first encoded data segment.

3. The terminal acquires a coordinate value of the preset touch point in the touch-plane coordinate system.

4. The terminal determines a first distance value and a second distance value according to the first data segment.

Among them, the first distance value is a distance value between the first touch point and the preset touch point; the second distance value is a distance value between the second touch point and the preset touch point; and the first distance value and the second distance value satisfy a second formula which is as follows:

$$C = A \times OP/OP_1 - B,$$

wherein C represents an ASCII code value corresponding to the first data segment, OP represents the first distance value, $OP_1$ represents the second distance value, and A and B are both constants. In an embodiment of the present disclosure, the values of A and B may be set by a technician, which will not be defined specifically in this embodiment of the present disclosure.

5. The terminal calculates a first coordinate value according to the first distance value, the first reference angle value, and the coordinate value of the preset touch point in the touch-plane coordinate system.

Among them, the first coordinate value is a coordinate value of the first touch point in the touch-plane coordinate system.

With the first distance value OP and the first reference angle value α determined and according to the trigonometric function, a distance between the first touch point and the preset touch point in the x-axis direction of the touch-plane coordinate system may be calculated; and a distance between the first touch point and the preset touch point in the y-axis direction of the touch-plane coordinate system may also be calculated.

An abscissa value of the first touch point in the touch-plane coordinate system may be calculated according to the distance between the first touch point and the preset touch point in the x-axis direction of the touch-plane coordinate system, and the abscissa value of the preset touch point in the touch-plane coordinate system.

An ordinate value of the first touch point in the touch-plane coordinate system may be calculated according to the distance between the first touch point and the preset touch point in the y-axis direction of the touch-plane coordinate system, and the ordinate value of the preset touch point in the touch-plane coordinate system.

The abscissa value of the first touch point in the touch-plane coordinate system and the ordinate value of the first touch point in the touch-plane coordinate system may constitute the first coordinate value.

6. The terminal calculates a second coordinate value according to the second distance value, the first reference angle value, and the coordinate value of the preset touch point in the touch-plane coordinate system.

Among them, the second coordinate value is a coordinate value of the second touch point in the touch-plane coordinate system. The technical process of calculating the second coordinate value is the same as the technical process of calculating the first coordinate value, which is not repeated in this embodiment of the present disclosure.

7. The terminal acquires a first encoded data segment obtained after the first data segment is encoded, where the first encoded data segment includes the first coordinate value and the second coordinate value.

In the second encoding mode, the terminal encodes each of the data segment(s) included in the target system information into a coordinate value of one touch point (hereinafter referred to as the third touch point) in a second virtual ray, in the touch-plane coordinate system. That is, the touch points in the pseudo-touch event include the third touch point.

Among them, the coordinate value of the third touch point in the touch-plane coordinate system, obtained by encoding a certain data segment by the terminal, is the encoded data segments corresponding to the data segment.

The second virtual ray is an imaginary ray in the touch plane with the preset touch point as an end point. The azimuth angle of the second virtual ray in the touch-plane coordinate system is obtained according to the data segment to be encoded. Optionally, the preset touch point may be a center point of the touch plane, that is, the preset touch point may be a center point of a terminal screen.

The distance value between the third touch point and the preset touch point is a specific value obtained according to a rank value of the data segment to be encoded in the data set in which the data segment is located. Since in a real touch event, the probability that the distance value between a touch point and the present touch point is right the specific value is low, therefore, the positional relationship may be set as both the third touch point and the preset touch point being located in the second virtual ray. In this way, by encoding the data segment into the coordinate value of the third touch point in the touch-plane coordinate system, the encoded pseudo-touch event information may be distinguished from the real touch information. Among them, the coordinate value, obtained by the encoding, of the third touch point in the touch-plane coordinate system may be regarded as the identification information in the encoded pseudo-touch information.

In this embodiment of the present disclosure, a second encoding manner is described by means of encoding a first data segment included in the target system information through the terminal, by way of example. Among them, the first data segment is any of the at least one data segment included in a first data set; and the first data set is any of the at least one data set obtained by dividing the target system information.

The technical process of encoding the first data segment included in the target system information by the terminal includes the following steps.

1. The terminal acquires a coordinate value of the preset touch point in the touch-plane coordinate system.

2. The terminal acquires a rank value of the first data segment among the at least one data segment included in the first data set.

3. The terminal acquires a distance value between the preset touch point and the third touch point according to the rank value of the first data segment among the at least one data segment included in the first data set.

Optionally, in an embodiment of the present disclosure, the terminal may query the distance value corresponding to the rank value of the first data segment among the at least one data segment included in the first data set from a preset distance correspondence table, and acquire the queried distance value as the distance value between the preset touch point and the third touch point. The distance correspondence table stores multiple sets of correspondences between distance values and rank values.

It may be known from the above description that the distance value between the preset touch point and the third touch point may characterize the rank value of the first data segment among the at least one data segment included in the first data set. In other words, in the second encoding mode, the distance value between the preset touch point and the third touch point is the sequence information in the first encoded data segment.

4. The terminal acquires a second reference angle value corresponding to the first data segment.

Among them, the second reference angle value is an azimuth angle of the second virtual ray in the touch-plane coordinate system.

Optionally, the technical process of acquiring the second reference angle value by the terminal may be as follows: the terminal acquires an ASCII code value of the first data segment; and the terminal queries the second reference angle value from a preset first angle correspondence table according to the ASCII code value of the first data segment. Among them, the first angle correspondence table stores multiple sets of correspondences between reference angle values and ASCII code values of data segments.

5. The terminal encodes the first data segment into the third coordinate value according to the coordinate value of the preset touch point in the touch-plane coordinate system, the distance value between the preset touch point and the third touch point, and the second reference angle value.

Among them, the third coordinate value is a coordinate value of the third touch point in the touch-plane coordinate system.

With the distance value between the preset touch point and the third touch point and the second reference angle value determined and according to the trigonometric function, a distance between the third touch point and the preset touch point in the x-axis direction of the touch-plane coordinate system may be calculated; and a distance between the third touch point and the preset touch point in the y-axis direction of the touch-plane coordinate system may also be calculated.

An abscissa value of the third touch point in the touch-plane coordinate system may be calculated according to the distance between the third touch point and the preset touch point in the x-axis direction of the touch-plane coordinate system, and the abscissa value of the preset touch point in the touch-plane coordinate system.

An ordinate value of the third touch point in the touch-plane coordinate system may be calculated according to the distance between the third touch point and the preset touch point in the y-axis direction of the touch-plane coordinate system, and the ordinate value of the preset touch point in the touch-plane coordinate system.

The abscissa value of the third touch point in the touch-plane coordinate system and the ordinate value of the third touch point in the touch-plane coordinate system may constitute the third coordinate value.

6. The terminal acquires a first encoded data segment obtained after the first data segment is encoded, where the first encoded data segment includes the third coordinate value.

In the third encoding mode, the terminal divides each of the data set(s) into multiple encoding sets, where each of the encoding sets includes at least two data segments of the data set in which the encoding set is located; and for each of the encoding sets, the terminal encodes the at least two data segments included in the encoding set according to the format of touch information to obtain a joint-encoded data segment.

In the embodiment of the present disclosure below, data segments included in the encoding sets being a first data segment, a second data segment, and a third data segment are used by way of example to explain the third encoding mode.

The technical process of encoding an encoded set according to the format of touch information by the terminal may include the following steps.

1. The terminal acquires a coordinate value of a fourth touch point in the touch-plane coordinate system according to the first data segment and the second data segment.

Optionally, the terminal may acquire an ASCII code value of the first data segment and an ASCII code value of the second data segment; then, the terminal may determine the ASCII code value of the first data segment as an x-axis coordinate of the fourth touch point in the touch-plane coordinate system, and determine the ASCII code value of the second data segment as a y-axis coordinate of the fourth touch point in the touch-plane coordinate system, thereby obtaining the coordinate value of the fourth touch point in the touch-plane coordinate system.

2. The terminal acquires a third reference angle value according to the third data segment.

The third reference angle value is an azimuth angle of a third virtual ray in the touch-plane coordinate system.

The technical process of acquiring the third reference angle value by the terminal may be as follows: the terminal acquires an ASCII code value of the third data segment; and the terminal queries the third reference angle value from a preset second angle correspondence table according to the ASCII code value of the third data segment. Among them, the second angle correspondence table stores multiple sets of correspondences between reference angle values and ASCII code values of data segments.

3. The terminal acquires coordinate values of three vertexes of a virtual triangle in the touch-plane coordinate system.

Among them, the respective touch points in the pseudo-touch event include the three vertexes, and the positional relationship may be set as an orthocenter of the virtual triangle being the fourth touch point, a perpendicular line of a designated side of the virtual triangle being located in the third virtual ray, and three sides of the virtual triangle having preset length values.

In an embodiment of the present disclosure, the virtual triangle is an acute-angled isosceles triangle, and the designated side of the virtual triangle is the bottom side of the acute-angled isosceles triangle.

In a real touch event, the probability that three touch points right form a triangles with three sides having the preset length values is low. Therefore, by encoding the data segments into the coordinate values of the three vertexes of the virtual triangle, the encoded pseudo-touch event information may be distinguished from the reach touch information. Among them, the coordinate values, obtained by the encoding, of the three vertexes of the virtual triangle may be regarded as the identification information in the encoded pseudo-touch information.

4. The terminal acquires the coordinate values of the three vertexes of the virtual triangle as the joint-encoded data segment.

In step 305, the terminal transmits the encoded pseudo-touch event information as an input parameter of the target script to the target script through the browser.

In an embodiment of the present disclosure, the terminal may encapsulate each of the encoded data set(s) in the at least one encoded data set included in the encoded pseudo-touch event information into a data packet so as to obtain at least one data packet; and then, the terminal may transmit the at least one data packet as the input parameter of the target script to the target script in sequence through the browser, where a transmission time interval between two adjacent data packets is greater than or equal to a first preset time interval.

In an embodiment of the present disclosure, the terminal may transmit the data packet(s) to the target script in segments through the browser, where a transmission time interval between two adjacent segments is greater than or equal to a second preset time interval.

By setting the transmission interval for two adjacent data packets and for two adjacent segments of one data packet, the transmission of the encoded pseudo-touch event information may be prevented from affecting the normal operation of the browser.

In addition, in order to prevent the transmission of the encoded pseudo-touch event information from affecting a real touch event, during transmitting the encoded pseudo-touch event information to a target script through a browser, the terminal in this embodiment of the present disclosure may stop transmitting the encoded pseudo-touch event information when receiving the touch information corresponding to the real touch event.

In step 306, the terminal executes the target script based on the encoded pseudo-touch event information through the browser.

After the target script receives the encoded pseudo-touch event information, the terminal may judge whether the encoded pseudo-touch event information includes the identification information through the browser; and when the encoded pseudo-touch event information includes the identification information, the terminal may decode the encoded pseudo-touch event information through the browser, thereby obtaining the target system information.

In summary, according to the system information transmitting method provided by the embodiments of the present disclosure, the terminal system is called at first to obtain the target system information; then the target system information is divided to obtain data segments; and finally, the respective data segments are encoded according to a positional relationship of respective touch points in a simulated pseudo-touch event in a touch plane to obtain encoded pseudo-touch event information. No matter whether supporting the W3C standard or not, the browsers have the function of transmitting the encoded touch event information to the script of the web page. Therefore, the browsers may transmit the encoded pseudo-touch event information to the target script of the web page as the input parameter, regardless of the supportability for the W3C standard, so that the browsers that do not support the W3C standard may also transmit the target system information obtained by calling the terminal system, to the target script in the web page, thereby ensuring the smooth execution of the target script in the web page.

Figure 4:
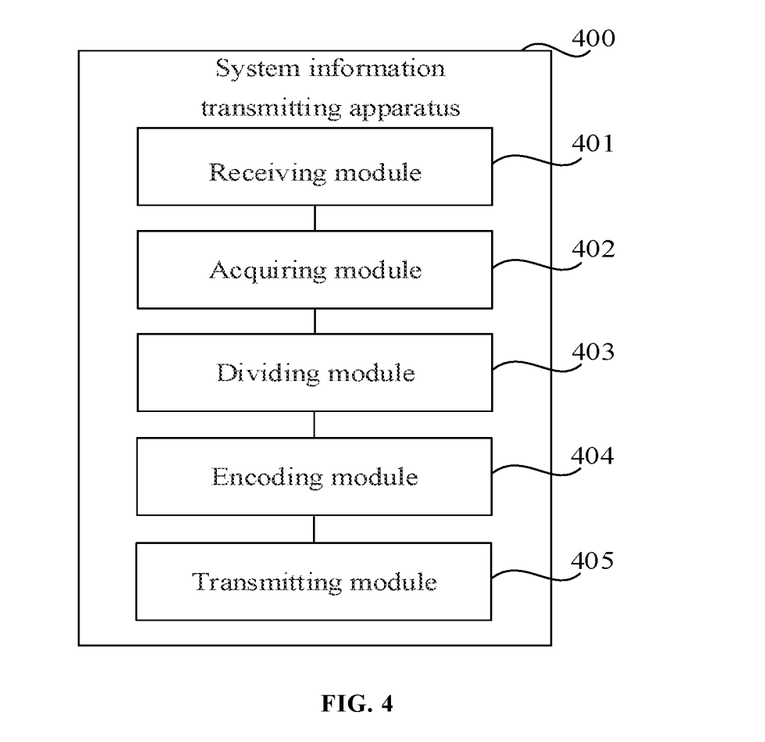
FIG. 4 is a block diagram showing a system information transmitting apparatus, according to an example of the present disclosure.

FIG. 4 is a block diagram showing a system information transmitting apparatus 400 in accordance with the present disclosure. The system information transmitting apparatus 400 may be provided in a terminal 100 shown in FIG. 1. Referring to FIG. 4, the system information transmitting apparatus 400 includes a receiving module 401, an acquiring module 402, a dividing module 403, an encoding module 404 and a transmitting module 405.

The receiving module 401 is configured to receive a system call instruction sent by a browser, where the system call instruction is generated when the browser executes a target script of a web page.

The acquiring module 402 is configured to acquire target system information according to the system call instruction.

The dividing module 403 is configured to divide the target system information acquired by the acquiring module 402 into at least one data set, where each of the data set(s) includes at least one data segment.

The encoding code 404 is configured to encode each of the data segment(s) in the target system information according to a positional relationship of respective touch points in a simulated pseudo-touch event in a touch plane to obtain encoded pseudo-touch event information.

The transmitting module 405 is configured to transmit the encoded pseudo-touch event information as an input parameter of the target script to the target script.

In an embodiment of the present disclosure, the encoding module 404 is configured to: for each of the data segment(s), encode the data segment according to the positional relationship of the respective touch points in the simulated pseudo-touch event in the touch plane to obtain an encoded data segment, where the encoded data segment includes sequence information which is configured to indicate a rank i of the data segment in the data set in which the data segment is located.

In an embodiment of the present disclosure, the encoded pseudo-touch event information includes at least one encoded data set in one-to-one correspondence to the at least one data set, each of the encoded data set(s) includes at least one encoded data segment, and the transmitting module 405 is configured to: encapsulate each of the encoded data set(s) in the at least one encoded data set into a data packet to obtain at least one data packet; and transmit the at least one data packet as an input parameter of the target script to the target script in sequence through the browser, wherein a transmission time interval between two adjacent data packets is greater than or equal to a first preset time interval.

In an embodiment of the present disclosure, the transmitting module 405 is configured to: transmit a first data packet to the target script in segments through the browser, wherein a transmission time interval between two adjacent segments is greater than or equal to a second preset time interval, and the first data packet is any of the at least one data packet.

In an embodiment of the present disclosure, the transmitting module 405 is further configured to: during the process that the encoded pseudo-touch event information is transmitted to the target script through the browser, stop transmitting the encoded pseudo-touch event information when touch information corresponding to the touch event is received.

In an embodiment of the present disclosure, the encoding module 404 is configured to: for each of the data segment(s), encode the data segment according to the positional relationship of the respective touch points in the simulated pseudo-touch event in the touch plane to obtain an encoded data segment. The encoded data segment includes a first coordinate value and a second coordinate value; the first coordinate value is a coordinate value of a first touch point in a touch-plane coordinate system; the second coordinate value is a coordinate value of a second touch point in the touch-plane coordinate system; and the positional relationship is that the first touch point, the second touch point, and a preset touch point are all located in a first virtual ray.

In an embodiment of the present disclosure, the encoding module 404 is configured to: acquire a first reference angle value, wherein the first reference angle value is an azimuth angle of the first virtual ray in the touch-plane coordinate system; acquire a coordinate value of the preset touch point in the touch-plane coordinate system; encode a first data segment into the first coordinate value and the second coordinate value according to the first reference angle value and the coordinate value of the preset touch point in the touch-plane coordinate system, wherein the first data segment is any of the at least one data segment included in a first data set, and the first data set is any of the at least one data set.

In an embodiment of the present disclosure, the encoding module 404 is configured to acquire a rank value of the first data segment among the at least one data segment included in the first data set; and acquire the first reference angle value according to the rank value.

In an embodiment of the present disclosure, the encoding module 404 is configured to calculate the first reference angle value corresponding to the rank value according to a first formula, which is as follows:

$$\alpha = i \times \frac{360°}{n},$$

wherein $\alpha$ represents the first reference angle value, i represents the rank value, and n represents a number of data segments included in the first data set.

In an embodiment of the present disclosure, the encoding module 404 is configured to:
determine the first distance value and the second distance value according to the first data segment. The first distance value is a distance value between the first touch point and the preset touch point, the second distance value is a distance value between the second touch point and the preset touch point, and the first distance value and the second distance value satisfy a second formula which is as follows:

$$C = A \times OP/OP_1 - B,$$

wherein C represents an ASCII code value corresponding to the first data segment, OP represents the first distance value, $OP_1$ represents the second distance value, and A and B are both constants.

The first coordinate value is calculated according to the first distance value, the first reference angle value, and a coordinate value of the preset touch point in the touch-plane coordinate system.

The second coordinate value is calculated according to the second distance value, the first reference angle value, and the coordinate value of the preset touch point in the touch-plane coordinate system.

In an embodiment of the present disclosure, the encoding module 404 is configured to: for each of the data segment(s), encode the data segment according to the positional relationship of the respective touch points in the simulated pseudo-touch event in the touch plane to obtain an encoded data segment. The encoded data segment includes a third coordinate value; the third coordinate value is a coordinate value of a third touch point in a touch-plane coordinate system; the positional relationship is that the third touch point and a preset touch point are both located in a preset second virtual ray; and an azimuth angle of the second virtual ray in the touch-plane coordinate system is obtained according to the data segment.

In an embodiment of the present disclosure, the encoding module 404 is configured to: acquire a coordinate value of the preset touch point in the touch-plane coordinate system; acquire a distance value between the preset touch point and the third touch point; acquire a second reference angle value corresponding to the first data segment, wherein the second reference angle value is an azimuth angle of the second virtual ray in the touch-plane coordinate system; encode the first data segment into the third coordinate value according to the coordinate value of the preset touch point in the touch-plane coordinate system, the distance value, and the second reference angle value, where the first data segment is any of the at least one data segment included in a first data set, and the first data set is any of the at least one data set.

In an embodiment of the present disclosure, the encoding module 404 is configured to: acquire an ASCII code value of the first data segment; and query the second reference angle value from a preset first angle correspondence table according to the ASCII code value of the first data segment. The first angle correspondence table stores multiple sets of correspondences between reference angle values and ASCII code values of data segments.

In an embodiment of the present disclosure, the encoding module 404 is configured to acquire a rank value of the first data segment among the at least one data segment included in the first data set; and acquire the distance value according to the rank value.

In an embodiment of the present disclosure, the encoding module 404 is configured to: query the distance value corresponding to the rank value from a preset distance correspondence table. The distance correspondence table stores multiple sets of correspondences between distance values and rank values.

In an embodiment of the present disclosure, the encoding module 404 is configured to: divide each of the data set(s) into multiple encoding sets, with each encoding set including at least two data segments of the data set; and for each of the encoding sets, encoding the at least two data segments included in the encoding set according to the positional relationship of the respective touch points in the simulated pseudo-touch event in the touch plane to obtain a joint-encoded data segment.

In an embodiment of the present disclosure, the at least two data segments included in the encoding set includes a first data segment, a second data segment and a third data segment. The encoding module 404 is configured to: acquire a coordinate value of a fourth touch point in the touch-plane coordinate system according to the first data segment and the second data segment; acquire a third reference angle value according to the third data segment, wherein the reference angle value is an azimuth angle of a third virtual ray in the touch-plane coordinate system; and acquire coordinate values of three vertexes of a virtual triangle, wherein the positional relationship is that an orthocenter center of the virtual triangle is the fourth touch point, a perpendicular line of a designated side of the virtual triangle is located in the third virtual ray, and three sides of the virtual triangle have preset length values.

In an embodiment of the present disclosure, the virtual triangle is an acute-angled isosceles triangle.

In an embodiment of the present disclosure, the encoding module 404 is configured to: acquire an ASCII code value of the first data segment; acquire an ASCII code value of the second data segment; determine the ASCII code value of the first data segment as an x-axis coordinate of the fourth touch point in the touch-plane coordinate system; and determine the ASCII code value of the second data segment as a y-axis coordinate of the fourth touch point in the touch-plane coordinate system.

In an embodiment of the present disclosure, the encoding module 404 is configured to: acquire an ASCII code value of the third data segment; and query the third reference angle value from a preset second angle correspondence table according to the ASCII code value of the third data segment. The second angle correspondence table stores multiple sets of correspondences between reference angle values and ASCII code values of data segments.

In an embodiment of the present disclosure, the first data segment has a length of 1 byte.

Figure 5:
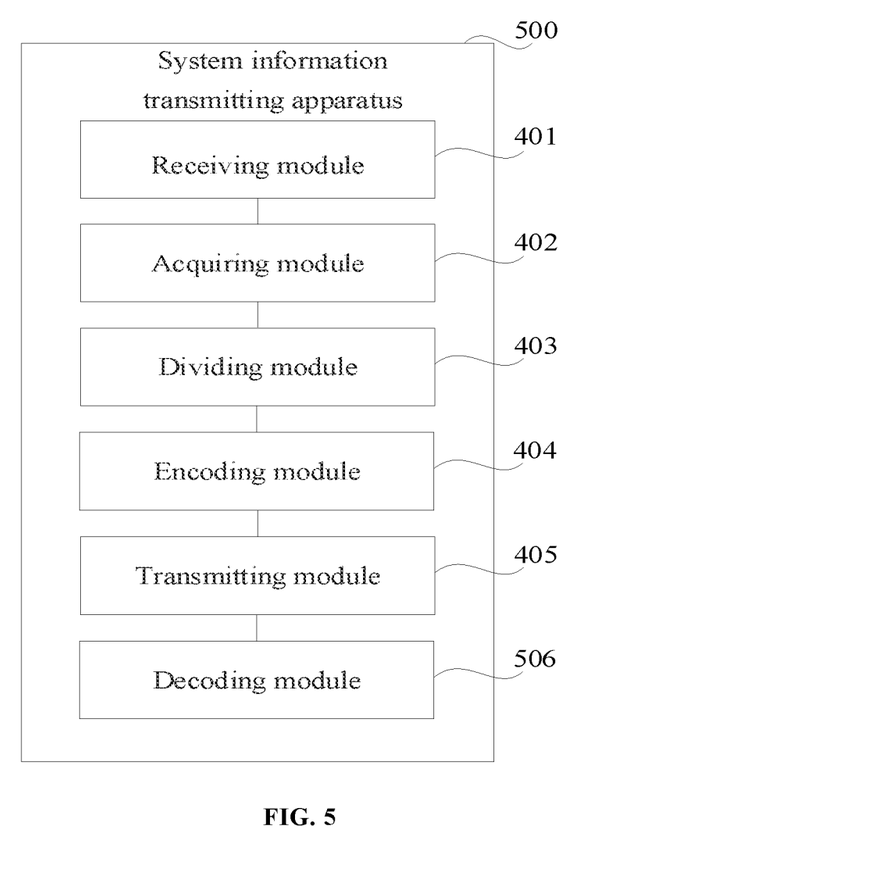
FIG. 5 is a block diagram showing a system information transmitting apparatus, according to an example of the present disclosure.

As shown in FIG. 5, the embodiments of the present disclosure also provide another system information transmitting apparatus 500. Besides all the modules of the system information transmitting apparatus 400, the system information transmitting apparatus 500 also includes a decoding module 506.

The encoded pseudo-touch event information includes identification information, which is configured to indicate that the encoded pseudo-touch event information is encoded system information. The decoding module 506 is configured to: execute the target script based on the encoded pseudo-touch event information through the browser after the target script receives the encoded pseudo-touch event information; judge whether the encoded pseudo-touch event information includes the identification information through the browser when executing the target script; and decode the encoded pseudo-touch event information through the browser to obtain the target system information when the encoded pseudo-touch event information includes the identification information.

In summary, according to the system information transmitting apparatus provided by the embodiments of the present disclosure, the terminal system is called at first to obtain the target system information; then the target system information is divided to obtain data segments; and finally, the respective data segments are encoded according to a positional relationship of respective touch points in a simulated pseudo-touch event in a touch plane to obtain encoded pseudo-touch event information. No matter whether supporting the W3C standard or not, the browsers have the function of transmitting the encoded touch event information to the script of the web page. Therefore, the browsers may transmit the encoded pseudo-touch event information to the target script of the web page as the input parameter, regardless of the supportability for the W3C standard, so that the browsers that do not support the W3C standard may also transmit the target system information obtained by calling the terminal system, to the target script in the web page, thereby ensuring the smooth execution of the target script in the web page.

With regard to the apparatus in the aforesaid embodiments, the specific manner in which the respective modules perform the operations has been described in detail in embodiments of the methods, and will not be explained in detail herein.

Figure 6:
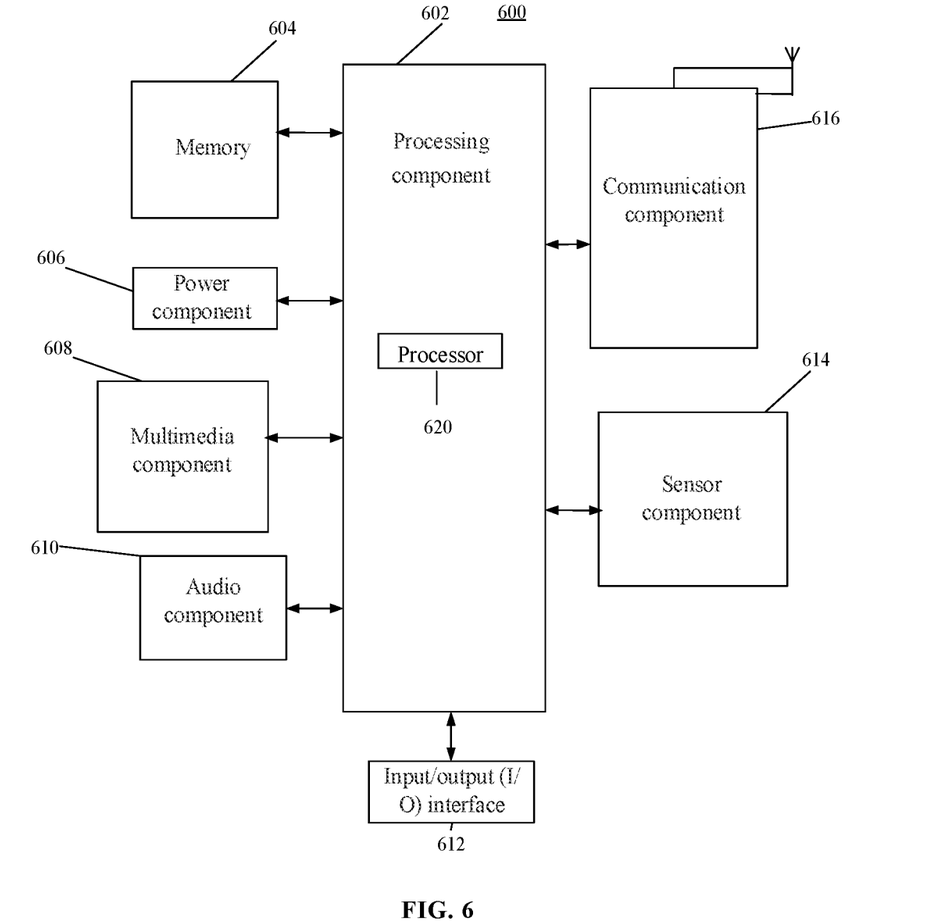
FIG. 6 is a block diagram showing a system information transmitting apparatus, according to an example of the present disclosure.

FIG. 6 is a block diagram of a system information transmitting apparatus 600 in accordance with the present disclosure. For example, the apparatus 600 may be a mobile phone, a computer, a digital broadcast terminal, a message transceiver device, a game console, a tablet device, a piece of medical equipment, a piece of fitness equipment, a personal digital assistant, and the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616. For example, the processing component can be a computing device having one or more processors.

The processing component 602 typically controls overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or nonvolatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a duration and a pressure associated with the touch or slip action. In some embodiments, the multimedia component 608 includes a front camera and/or a rear camera. The front camera and the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a complementary metal oxide semiconductor (CMOS) or charge-coupled device (CCD) image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, or 3G, or a combination thereof. In one example, the communication component 616 receives a broadcast signal or broadcast associated information from an external broadcast management system via a broadcast channel. In one example, the communication component 616 further includes a near field communication (NFC) module to facilitate short-range communications.

In the present disclosure, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods.

In the present disclosure, there is also provided a non-temporary computer-readable storage medium including instructions, such as the memory 604 including instructions. These instructions may be loaded and executed by the processor 620 in the apparatus 600 for executing the above methods. For example, the non-transitory computer readable storage medium may be a ROM, a random-access memory (RAM), a CD-ROM, a magnetic tape, a floppy disk, an optical data storage device or the like.

In the present disclosure, there is also provided a non-temporary computer-readable storage medium. When the instructions in the storage medium are executed by the processor of a mobile terminal, the mobile terminal can be caused to execute the above system information transmitting methods provided by the embodiments of the present disclosure.

In the present disclosure, there is also provided a computer-readable storage medium which is a non-transitory computer-readable storage medium. The computer-readable storage medium stores a computer program. When the stored computer program is executed by a processing component, the system information transmitting methods provided by the embodiments of the present disclosure can be realized.

An embodiment of the present disclosure provides a computer program product with instructions stored therein. When the instructions run on a computer, the computer can execute the system information transmitting methods provided by the embodiments of the present disclosure.

An embodiment of the present disclosure provides a chip including a programmable logic circuit and/or program instruction. During running of the chip, the system information transmitting methods provided by the embodiments of the present disclosure can be realized.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as examples, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for transmitting system information, comprising:
   receiving, at a terminal, a system call instruction sent by a browser, wherein the system call instruction is generated when the browser executes a target script of a web page;
   acquiring, at the terminal, target system information according to the system call instruction;
   dividing, at the terminal, the target system information into at least one data set, wherein the at least one data set comprises at least one data segment;
   obtaining, at the terminal, encoded pseudo-touch event information by encoding the at least one data segment in the target system information according to a positional relationship of respective touch points in a simulated pseudo-touch event in a touch plane; and
   transmitting, from the terminal, as an input parameter of the target script, the encoded pseudo-touch event information to the target script through the browser.

2. The method according to claim 1, wherein the at least one encoded data segment comprises sequence information which is configured to indicate a rank of the encoded data segment in the data set in which the encoded data segment is located.

3. The method according to claim 1, wherein the encoded pseudo-touch event information comprises at least one encoded data set in one-to-one correspondence to the at least one data set, wherein the at least one encoded data set comprises the at least one encoded data segment, and wherein transmitting, from the terminal, as the input parameter of the target script, the encoded pseudo-touch event information to the target script through the browser comprises:
   obtaining, at the terminal, at least one data packet by encapsulating the at least one encoded data set into a data packet; and
   transmitting, from the terminal, as the input parameter of the target script, the at least one data packet to the target script in sequence through the browser, wherein a transmission time interval between two adjacent data packets is not less than a first preset time interval.

4. The method according to claim 3, wherein transmitting, from the terminal, as the input parameter of the target script, the at least one data packet to the target script in sequence through the browser comprises:
   transmitting, from the terminal, a first data packet to the target script in segments through the browser, wherein a transmission time interval between two adjacent segments is not less than a second preset time interval, and the first data packet is the at least one data packet.

5. The method according to claim 1, further comprising:
   ending the transmission, from the terminal, of the encoded pseudo-touch event information when touch information corresponding to a touch event is received during the transmission, from the terminal, of the encoded pseudo-touch event information to the target script through the browser.

6. The method according to claim 1, wherein the at least one encoded data segment comprises a first coordinate value and a second coordinate value, wherein the first coordinate value is a coordinate value of a first touch point in a touch-plane coordinate system, wherein the second coordinate value is a coordinate value of a second touch point in the touch-plane coordinate system, and wherein the positional relationship is that the first touch point, the second touch point, and a preset touch point are located in a first virtual ray.

7. The method according to claim 6, wherein encoding the data segment according to the positional relationship of the respective touch points in the simulated pseudo-touch event in the touch plane to obtain the at least one encoded data segment comprises:
   acquiring, at the terminal, a first reference angle value, wherein the first reference angle value is an azimuth angle of the first virtual ray in the touch-plane coordinate system;
   acquiring, at the terminal, a coordinate value of the preset touch point in the touch-plane coordinate system; and
   encoding, at the terminal, a first data segment into the first coordinate value and the second coordinate value according to the first reference angle value and the coordinate value of the preset touch point in the touch-plane coordinate system, wherein the first data segment is the at least one data segment comprised in a first data set, and the first data set is the at least one data set.

8. The method according to claim 7, wherein acquiring, at the terminal, the first reference angle value comprises:
   acquiring, at the terminal, a rank value of the first data segment among the at least one data segment comprised in the first data set; and
   acquiring, at the terminal, the first reference angle value according to the rank value.

9. The method according to claim 8, wherein encoding the first data segment into the first coordinate value and the second coordinate value according to the first reference angle value and the coordinate value of the preset touch point in the touch-plane coordinate system comprises:
   determining, at the terminal, a first distance value and a second distance value according to the first data segment, wherein the first distance value is a distance value between the first touch point and the preset touch point, wherein the second distance value is a distance value between the second touch point and the preset touch point;
   calculating, at the terminal, the first coordinate value according to the first distance value, the first reference angle value, and the coordinate value of the preset touch point in the touch-plane coordinate system; and
   calculating, at the terminal, the second coordinate value according to the second distance value, the first reference angle value, and the coordinate value of the preset touch point in the touch-plane coordinate system.

10. The method according to claim 1,
    wherein the at least one encoded data segment comprises a third coordinate value, wherein the third coordinate value is a coordinate value of a third touch point in a touch-plane coordinate system, wherein the positional relationship is that the third touch point and a preset touch point are located in a preset second virtual ray, and wherein an azimuth angle of the second virtual ray in the touch-plane coordinate system is obtained according to the data segment.

11. An apparatus, comprising:
    one or more processors;
    a non-transitory computer-readable storage medium storing instructions executable by the one or more processors,
    wherein the one or more processors are configured to:
       receive a system call instruction sent by a browser, wherein the system call instruction is generated when the browser executes a target script of a web page;

acquire target system information according to the system call instruction;

divide the target system information into at least one data set, wherein the at least one data set comprises at least one data segment;

obtain encoded pseudo-touch event information by encoding the at least one data segment in the target system information according to a positional relationship of respective touch points in a simulated pseudo-touch event in a touch plane; and transmit, as an input parameter of the target script, the encoded pseudo-touch event information to the target script through the browser.

12. The apparatus according to claim 11, wherein the at least one encoded data segment comprises sequence information which is configured to indicate a rank of the encoded data segment in the data set in which the encoded data segment is located.

13. The apparatus according to claim 11, wherein the encoded pseudo-touch event information comprises at least one encoded data set in one-to-one correspondence to the at least one data set, wherein the at least one encoded data set comprises the at least one encoded data segment, and wherein the one or more processors are configured to:

obtain at least one data packet by encapsulating the at least one encoded data set into a data packet; and transmit, as the input parameter of the target script, the at least one data packet to the target script in sequence through the browser, wherein a transmission time interval between two adjacent data packets is not less than a first preset time interval.

14. The apparatus according to claim 13, wherein the one or more processors are configured to:

transmit a first data packet to the target script in segments through the browser, wherein a transmission time interval between two adjacent segments is not less than a second preset time interval, and the first data packet is the at least one data packet.

15. The apparatus according to claim 11, wherein the one or more processors are further configured to:

end the transmission of the encoded pseudo-touch event information when touch information corresponding to a touch event is received during the transmission of the encoded pseudo-touch event information to the target script through the browser.

16. The apparatus according to claim 11, wherein the at least one encoded data segment comprises a first coordinate value and a second coordinate value, wherein the first coordinate value is a coordinate value of a first touch point in a touch-plane coordinate system, wherein the second coordinate value is a coordinate value of a second touch point in the touch-plane coordinate system, and wherein the positional relationship is that the first touch point, the second touch point, and a preset touch point are located in a first virtual ray.

17. The apparatus according to claim 16, wherein the one or more processors are configured to:

acquire a first reference angle value, wherein the first reference angle value is an azimuth angle of the first virtual ray in the touch-plane coordinate system;

acquire a coordinate value of the preset touch point in the touch-plane coordinate system; and encode a first data segment into the first coordinate value and the second coordinate value according to the first reference angle value and the coordinate value of the preset touch point in the touch-plane coordinate system, wherein the first data segment is the at least one data segment comprised in a first data set, and the first data set is the at least one data set.

18. The apparatus according to claim 17, wherein the one or more processors are configured to:

acquire a rank value of the first data segment among the at least one data segment comprised in the first data set; and acquire the first reference angle value according to the rank value.

19. The apparatus according to claim 17, wherein the one or more processors are configured to:

determine a first distance value and a second distance value according to the first data segment, wherein the first distance value is a distance value between the first touch point and the preset touch point, wherein the second distance value is a distance value between the second touch point and the preset touch point;

calculate the first coordinate value according to the first distance value, the first reference angle value, and the coordinate value of the preset touch point in the touch-plane coordinate system; and calculate the second coordinate value according to the second distance value, the first reference angle value, and the coordinate value of the preset touch point in the touch-plane coordinate system.

20. A non-transitory computer-readable storage medium, in which a plurality of computer programs are stored, wherein the plurality of computer programs are executed by a computing device having one or more processors to perform acts comprising:

receiving a system call instruction sent by a browser, wherein the system call instruction is generated when the browser executes a target script of a web page;

acquiring target system information according to the system call instruction;

dividing the target system information into at least one data set, wherein the at least one data set comprises at least one data segment;

obtaining encoded pseudo-touch event information by encoding the at least one data segment in the target system information according to a positional relationship of respective touch points in a simulated pseudo-touch event in a touch plane; and transmitting, as an input parameter of the target script, the encoded pseudo-touch event information to the target script through the browser.

* * * * *